United States Patent
Cohen

(10) Patent No.: US 11,656,332 B2
(45) Date of Patent: *May 23, 2023

(54) METHOD AND APPARATUS FOR DETECTION OF A METASURFACE

(71) Applicant: Fractal Antenna Systems, Inc., Bedford, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,124

(22) Filed: Aug. 8, 2022

(65) Prior Publication Data

US 2022/0381686 A1 Dec. 1, 2022

Related U.S. Application Data

(63) Continuation of application No. 16/399,778, filed on Apr. 30, 2019, now Pat. No. 11,408,976.

(60) Provisional application No. 62/664,453, filed on Apr. 30, 2018.

(51) Int. Cl.
*G01S 7/41* (2006.01)
*G01S 13/88* (2006.01)
*G01N 21/31* (2006.01)
*G01N 21/45* (2006.01)

(52) U.S. Cl.
CPC ............... *G01S 7/41* (2013.01); *G01N 21/31* (2013.01); *G01N 21/45* (2013.01); *G01S 13/88* (2013.01)

(58) Field of Classification Search
CPC ........... G01S 7/41; G01S 13/88; G01N 21/31; G01N 21/45
See application file for complete search history.

(56) References Cited

U.S. PATENT DOCUMENTS

| | | | | |
|---|---|---|---|---|
| 4,053,891 A | * | 10/1977 | Opitz | G01S 7/414 342/193 |
| 4,648,124 A | * | 3/1987 | Mantovani | H04B 17/20 324/624 |
| 5,191,343 A | * | 3/1993 | Danzer | G01S 7/41 342/21 |
| 6,765,527 B2 | | 7/2004 | Jablonski et al. | |
| 6,897,777 B2 | * | 5/2005 | Holmes | G01V 3/12 340/572.2 |
| 7,639,178 B1 | * | 12/2009 | Mulbrook | G01S 7/35 342/146 |

(Continued)

OTHER PUBLICATIONS

Gallagher et al., "Nonlinear Synthetic Aperture Radar Imaging Using A Harmonic Radar" Proc. SPIE 9461, Radar Sensor Technology XIX; and Active and Passive Signatures VI, 946109; Published May 21, 2015; 12 pages.

(Continued)

*Primary Examiner* — Peter M Bythrow
(74) *Attorney, Agent, or Firm* — Daly, Crowley, Mofford & Durkee, LLP

(57) ABSTRACT

Systems, apparatus, and methods are described that provide for detection of a metamaterial surface (metasurface) on a device or object. Multitone EM radiation is transmitted to the object having the metasurface. Two or more heterodyned tones are backscattered from the object and detected.

9 Claims, 2 Drawing Sheets

(56) References Cited

U.S. PATENT DOCUMENTS

| | | | | |
|---|---|---|---|---|
| 7,777,671 B2* | 8/2010 | Schnitzer | | G01S 7/292 |
| | | | | 342/90 |
| 7,777,672 B2* | 8/2010 | Schnitzer | | G01S 7/282 |
| | | | | 342/90 |
| 7,830,299 B2* | 11/2010 | Steele | | G01S 7/414 |
| | | | | 342/13 |
| 7,864,107 B1* | 1/2011 | Lehtola | | G01S 13/887 |
| | | | | 342/146 |
| 7,893,862 B2* | 2/2011 | Holly | | G01S 13/87 |
| | | | | 342/195 |
| 7,999,723 B2* | 8/2011 | Jung | | G01V 3/12 |
| | | | | 342/13 |
| 8,054,212 B1* | 11/2011 | Holly | | G01S 7/024 |
| | | | | 342/13 |
| 8,275,334 B1* | 9/2012 | Judd | | G01S 13/284 |
| | | | | 455/227 |
| 8,275,572 B2* | 9/2012 | Burns | | G01S 13/588 |
| | | | | 702/158 |
| 8,903,669 B1* | 12/2014 | Holly | | G01S 13/887 |
| | | | | 702/75 |
| 9,395,434 B2* | 7/2016 | Mazzaro | | G01S 7/02 |
| 9,476,973 B2* | 10/2016 | Mazzaro | | G01S 13/87 |
| 9,689,964 B2* | 6/2017 | Sarangapani | | G01S 7/41 |
| 9,772,363 B2* | 9/2017 | Canne | | H04B 17/00 |
| 9,958,707 B2* | 5/2018 | Atwater | | G02F 1/0121 |
| 10,203,405 B2* | 2/2019 | Mazzaro | | G01S 13/103 |
| 10,234,543 B2* | 3/2019 | Mazzaro | | G01S 7/354 |
| 2003/0179126 A1* | 9/2003 | Jablonski | | G01S 7/41 |
| | | | | 342/90 |
| 2003/0179136 A1 | 9/2003 | Kohno et al. | | |
| 2004/0095243 A1* | 5/2004 | Holmes | | G01V 3/12 |
| | | | | 340/552 |
| 2007/0013577 A1* | 1/2007 | Schnitzer | | G01S 7/292 |
| | | | | 342/146 |
| 2007/0046298 A1* | 3/2007 | Satai | | G01N 22/02 |
| | | | | 324/639 |
| 2007/0232738 A1* | 10/2007 | Bratkovski | | G02F 1/355 |
| | | | | 524/495 |
| 2007/0263278 A1* | 11/2007 | Chowdhury | | G02F 1/3534 |
| | | | | 359/332 |
| 2008/0252293 A1* | 10/2008 | Lagae | | H04B 1/7163 |
| | | | | 324/318 |
| 2009/0009380 A1* | 1/2009 | Schnitzer | | G01S 7/285 |
| | | | | 342/90 |
| 2009/0173886 A1* | 7/2009 | Chowdhury | | G01S 13/04 |
| | | | | 250/393 |
| 2010/0245152 A1 | 9/2010 | Krikorian et al. | | |
| 2013/0006299 A1 | 1/2013 | Pipenhagen et al. | | |
| 2014/0313071 A1* | 10/2014 | McCorkle | | G01S 13/106 |
| | | | | 342/202 |
| 2017/0026095 A1* | 1/2017 | Ashrafi | | H04B 7/10 |
| 2017/0307726 A1* | 10/2017 | Mazzaro | | G01S 13/32 |
| 2019/0021626 A1* | 1/2019 | Cano Garcia | | A61B 5/4312 |
| 2019/0044246 A1* | 2/2019 | Pitsillides | | H01Q 15/0086 |
| 2019/0064074 A1* | 2/2019 | Ragan | | G06N 20/00 |
| 2019/0146082 A1* | 5/2019 | Cohen | | H01Q 15/0086 |
| | | | | 342/70 |
| 2019/0170484 A1* | 6/2019 | Kante | | F41H 3/02 |
| 2019/0334248 A1* | 10/2019 | Piau | | H01Q 1/28 |
| 2020/0412005 A1* | 12/2020 | Olk | | H01Q 15/0086 |

OTHER PUBLICATIONS

Gallagher et al., "Moving Target Indication with Non-linear Radar" presented at the Radar Conference (RadarCon), 2015 IEEE of May 10-15, 2015; 6 pages.

Mazzaro et al., "Detection of RF Electronics by Multitone Harmonic Radar" IEEE Transactions on Aerospace and Electronic Systems, vol. 50, No. 1; Published Jan. 2014; 14 pages.

\* cited by examiner

METHOD AND APPARATUS FOR DETECTION OF A METASURFACE

CROSS-REFERENCE TO RELATED APPLICATIONS

This application is a continuation of U.S. patent application Ser. No. 16/399,778, entitled "Method and Apparatus for Detection of a Metasurface," filed on Apr. 30, 2019, which application is based on and claims priority to U.S. provisional patent application 62/664,453, entitled "Method and Apparatus for Detection of a Metasurface," filed Apr. 30, 2018; the entire content of each of these noted applications is incorporated herein by reference.

BACKGROUND

The use of non-linear responses for target recognition in radar systems is known. Radar systems relying on detecting such non-linear responses often referred to as "harmonic radars." Examples of prior art harmonic radar systems are disclosed in U.S. Pat. Nos. 4,053,891, 6,765,527, and 7,864,107 and also U.S. Patent Application Publication Nos. 2010/0245152, 2003/0179136, 2017/0307726, 2014/0313071, and 2013/006299; the entire contents of which are incorporated herein by reference. Such prior art harmonic radars are typically used to learn about the composition of materials under radar interrogation by searching for harmonic-heterodyned frequencies and/or harmonics of the transmitted interrogation frequency or frequencies alone.

Such harmonic radar systems have difficulty in, and may be incapable of, detecting metamaterials, including structures and surfaces including metamaterials (which may be referred to as "metasurfaces"). As is known, such metamaterials or metasurfaces can be designed to minimize or reduce the radar cross section (RCS) of objects, thus making the objects more difficult to "see" with conventional radar techniques. The nonlinear response of metasurfaces to radar interrogation energy is typically not solely harmonic in nature, and, for example, can exhibit a significant deviation or offset from the fundamental frequency or frequencies used by the transmitting radar.

SUMMARY

The present disclosure is directed to systems, apparatus, and methods that provide for detection of a metamaterial surface (metasurface) on or in a device or object. Normally, the backscatter of electromagnetic (EM) radiation impinging such a metasurface is suppressed otherwise rendering the device or object difficult to detect. Embodiments of the present disclosure utilize radar transmitters producing swept or chirped multi-tone RF energy for detecting objects having a metasurface. RF energy that is backscattered from the object(s) includes heterodyned combinations of the multi-tone RF energy from the transmitter. A detecting system detects two or more tones having the same signature or pattern in log-frequency v. time, thus detecting the object having the metasurface even though the object—due to the metasurface—may have a radar cross section (RCS) that is very small at each of the fundamental frequencies of the interrogation energy produced by the transmitter.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Figure 1:
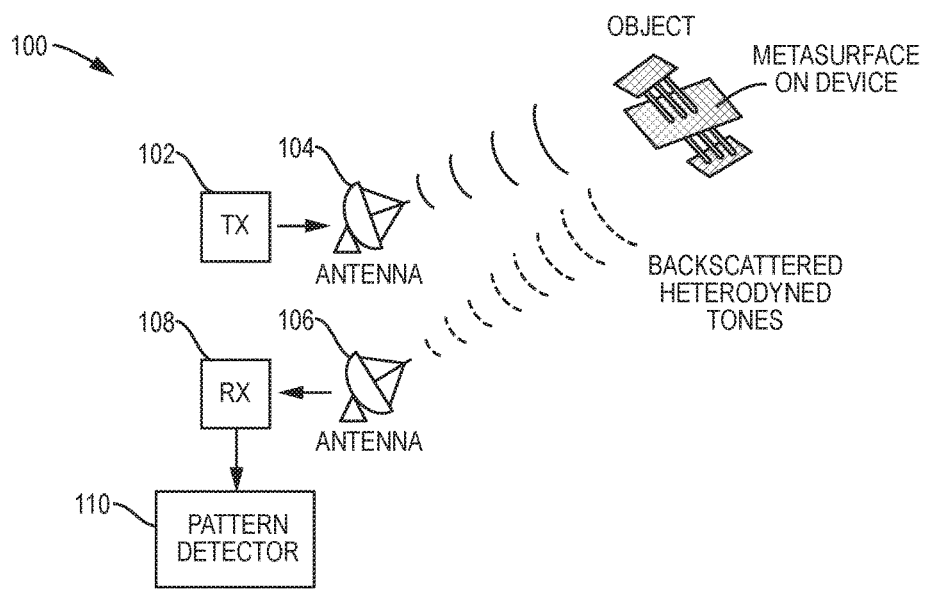
FIG. 1 depicts a simplified diagram of exemplary system in accordance with the present disclosure.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An aspect of the present disclosure is directed to systems, apparatus, and methods that provide for detection of a metamaterial surface (metasurface) on a device or object, which due to the presence of the metasurface, would be difficult or impossible to detect due to suppression of the backscattered impinging electromagnetic (EM) radiation. Systems, apparatus, and methods according to the present disclosure allow or provide more pronounced detection ability, and utilize two or more simultaneous transmissions of narrowband electromagnetic waves to produce heterodyned tones, e.g., sum(s), difference(s), and/or product(s) of the two or more simultaneous transmissions, which are effectively backscattered and then detected, e.g., either at the signal source (transmitting antenna) via range delay, or bi-statically at a separate receiving antenna via range delay.

Typically a metasurface is a structure composed of a close packed collection of EM-resonant shapes, which are capable of radiative transport along the surface and at angles approaching perpendicular to impinging EM waves. Such a metasurface can redirect an incoming EM wave along its surface as opposed to necessarily reflecting it (backscatter), which is what would normally be expected for the case of a non-metamaterial. As one result, metasurfaces have been employed used for low-visibility profiles of devices, blocking radar detection, for example, because of their low backscatter and side scatter.

Such metasurfaces typically have well-defined passbands of use. In the case of metamaterials that are designed to present low RCS and mask (as so-called "invisibility cloaks") the presence of otherwise detectable objects, while such passbands can be broad in some circumstances, these passbands nevertheless limit the frequency range over which a metasurface is capable of redirecting waves along the surface. For example, a metasurface designed to minimize RCS over a given radar band (e.g., Ka or X band) will be incapable of operation, e.g., supporting evanescent-wave surface transmission, above a prescribed frequency limit, which is determined by the size scaling of the resonators and close packed proximity separation of the resonators that make up the metasurface. Such an upper limit in frequency, however, may be high enough so as to preclude reflection or backscattering at the frequencies of operation of most practical radar transmissions. Representative cloaking systems/techniques are described in U.S. Pat. No. 10,038,230, the entire content of which is incorporated herein by reference.

Embodiments of the present disclosure work by transmitting two or more electromagnetic waves, or "tones," each of which are swept or varied in frequency, preferably in a linear fashion with time (although nonlinear sweeping is contemplated within the scope of this disclosure), and with the sweeps or "chirps" preferably being at the same rate of change in frequency. These frequencies of transmissions, e.g., as produced by a transmitting radar antenna, may themselves be within the passband or passbands of the metasurface, and thus might not produce sufficient backscatter for detection of the reflected transmissions. But due to the presence and detection of heterodyned tones produced by the nonlinear response of the metasurface (to the incident energy of the two or more tones,) embodiments of the present disclosure can nonetheless detect the metasurface(s) and, thereby, any object associated with the metasurface(s). Exemplary embodiments of the present disclosure thus avoid standard problematic issues of transmission, propagation, and reception of these high frequencies (e.g., those beyond the noted upper limit of a passband), but may be transmitted at far lower frequencies, and through sum, difference, and/or product combinations (e.g., linear combinations) as described above, and thereby allow for appropriate detection of the metasurface(s). Unlike typical prior art harmonic radar systems, two or more of these combinations of heterodyned tones are recognized for embodiments of the present disclosure as being produced by metasurface in response to incident energy from the multi-tone energy transmitted by the transmitting antenna. For non-limiting examples, such heterodyned tones (linear combinations) could be the third overtone of tone 1 minus the second overtone of tone 2, or the 5th overtone of tone 2 plus the second overtone of tone 1. Of course, other combinations of the two or more tones are within the scope of the present disclosure.

FIG. 1 depicts a simplified diagram of exemplary system 100 in accordance with the present disclosure. System 100 includes a transmitter 102 which is operatively connected to a transmitting antenna 104. In operation the transmitter 102 and antenna 104 function to transmit two or more tones toward an object having a metasurface (indicated as "Object"). The radiation of the two or more tones becomes incident on the metasurface and then is backscattered as multiple heterodyned tones, as indicated. The heterodyned tones are received at a receiving antenna 106, which is operative coupled to a receiver IDS, which is operatively connected to a pattern detector or pattern detector system 110. Through pattern detection according to the present disclosure, explained in further detail below, the system can detect the metasurface of the Object. The pattern detector can include a suitable processor with suitable code/software to implement the described processing. Embodiments of transmitter 102 and antenna 104 can be used to produce RF energy (tones) at virtually any frequencies of interest, and as pulsed and/or CW radiation. Examples include but are not limited to those at or near HF, VHF, UHF, L, S, C, X, Ku, K, Ka, V, W, and/or mm frequencies of operation. Exemplary embodiments may utilize/produce terahertz (THz) and/or optical (IR, visible light, UV) frequencies of operation.

Figure 2:
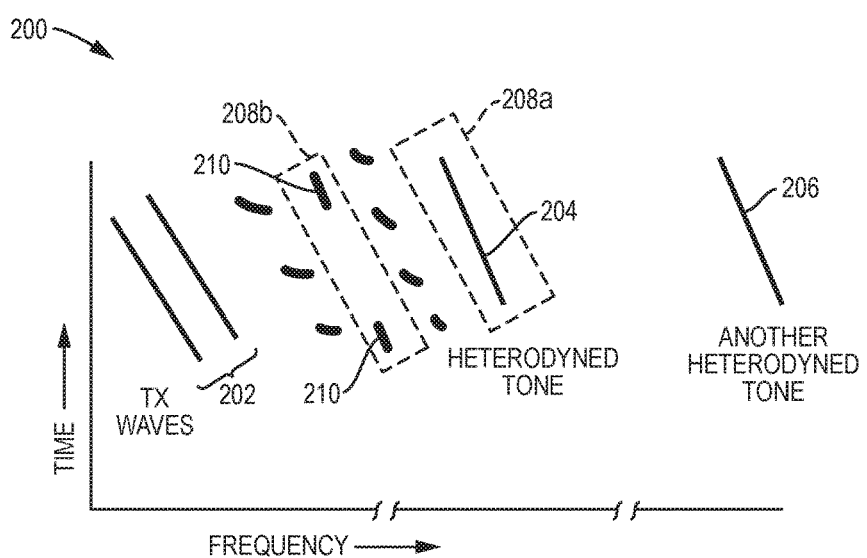
FIG. 2 is a graph depicting waterfall displays showing how a pattern replicates in log frequency-time for heterodyned-tones in accordance with the present disclosure.

FIG. 2 is a graph 200 depicting waterfall displays showing how a pattern replicates in log-frequency vs. time for heterodyned-tones in accordance with the present disclosure. A pair of transmitted waves 202, e.g., as transmitted by antenna 104, is shown in relation to multiple heterodyned tones 204 and 206, e.g., as produced by the metasurface of the Object of FIG. 1. While heterodyned tones 204 and 206 are indicated as being at higher frequencies that the transmitted tones 202, this is not necessarily the case; other, e.g. lower-frequency heterodyned tones may of course be detected within the scope of the present disclosure. As noted above, due to the nonlinear response of a metasurface, e.g., as shown in FIG. 1, when two or more radar tones generated and transmitted from a transmit antenna impinge on a metasurface, the reflected emissions, although unknown a priori, include (non-harmonic and possibly harmonic) heterodyned components, e.g., linear combinations of the incident tones.

As shown in FIG. 2, embodiments of the present disclosure utilize a deterministic frequency sweep or "chirp" for the two or more transmitted tones 202, which results in the ratio of the frequencies being a constant offset for a given heterodyned product/combination, in log-frequency space. This frequency invariance becomes evident in the search space for such received products (tones) by plotting the data on a log frequency scale, also as shown in FIG. 2. Thus the heterodyned products or tones, e.g., 204 and 206, are offset from one another by a translation in frequency and have the same slope of log-frequency relative to time. A search in the search space (e.g., as indicated) in which specific slopes are sought will thus "match" two or more of these heterodyned products, exclusive of clutter or noise, thereby leading to detection of the metasurface.

With continuing reference to FIG. 2, due to the described tone transmissions and their frequency sweep, each of these heterodyned-tones (and there may be many that are realized above the upper limit of the metasurface passband) will have a unique relationship in how they change frequency over time, when viewed as groupings, e.g., pairs. If plotted with frequency on a log scale, a waterfall type spectrum will reveal that one heterodyned-tone has the same log frequency offset in time as another heterodyned-tone as the tones are generated (by the metasurface) in response to the interrogation/transmit signals/pulses from the transmitter. This is because the ratio of two heterodyned-tones, in logarithmic frequency space, amounts to a log frequency translation between the two (or more) heterodyned-tones. Furthermore, the ratio of same is Doppler invariant. In other words, on a log frequency-time display, one heterodyned-overtone will trace out the same pattern as another heterodyned-tone, but translated as a constant arithmetic offset in log frequency, with that offset between heterodyned-overtones determined by the log ratios of same. This makes detection a benefit of a "matched filter," in which even momentary partial detection at one heterodyned-tone allows for an overlay or cross correlation means of detection many heterodyned-tones, increasing the detection ability through multiple additions of signal in a detection algorithm. A representative matched filter is indicated as 208 in the drawing. Matched filter 208 is shown (at 208a) surrounding heterodyned tone 204 (and may be designed based on the pattern of 204). Matched filter 208 (shown at 208b) is shown being used to detect partially-obscured tone 210, which is otherwise not readily apparent in background noise. Thus, as shown in FIG. 2, a simply devised detection algorithm is readily possible in real-time, across a vast frequency range, with minimal computational power required.

Figure 3:
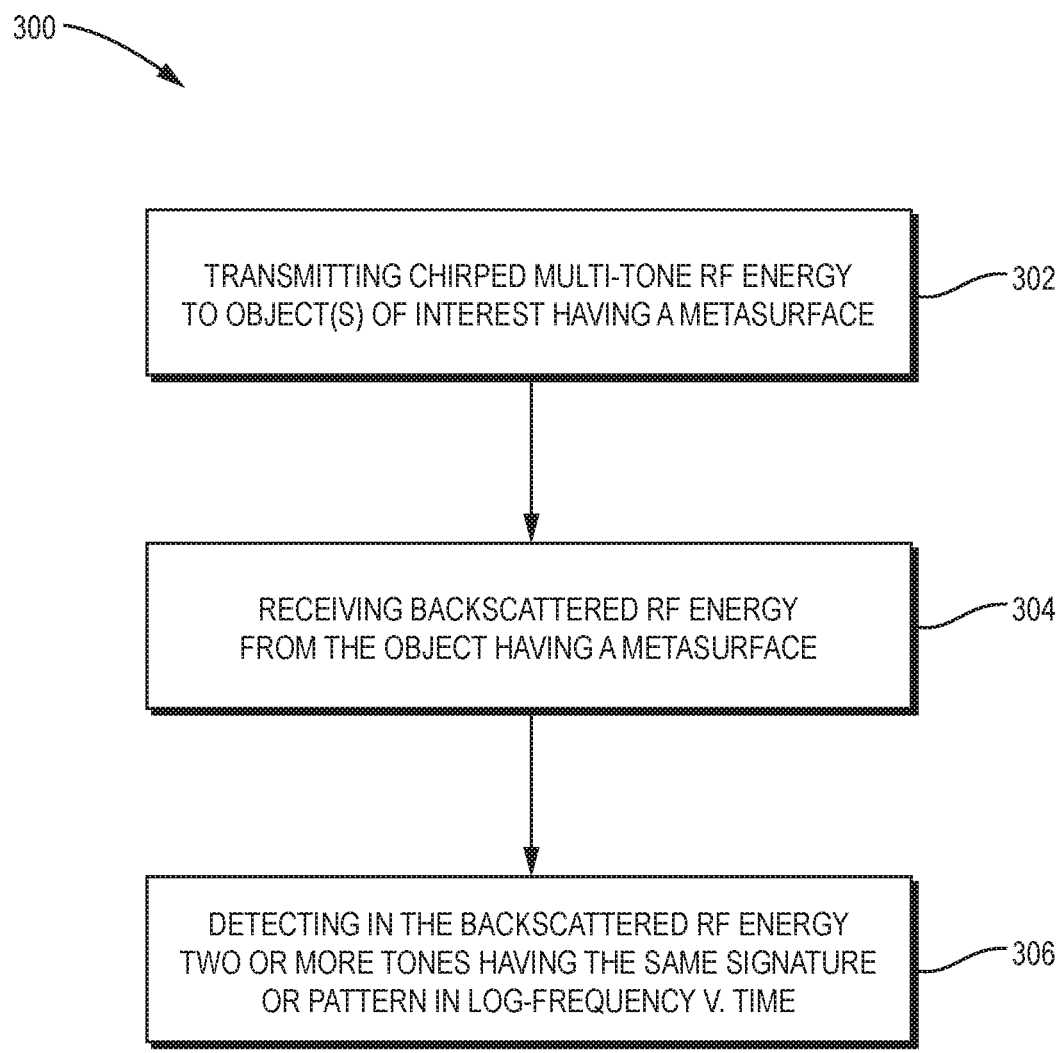
FIG. 3 depicts steps in an exemplary method or algorithm for detecting a metasurface, in accordance with the present disclosure.

FIG. 3 depicts steps in an exemplary method or algorithm 300 for detecting a metasurface, in accordance with the present disclosure. As indicated at 302, chirper multi-tone RF energy is transmitted to one or more objects of interest having a metasurface. The object(s) can have a known, unknown, or estimated location. Backscattered energy is then received from the object(s), as indicated at 304. Two or more heterodyned tones are then detected in the backscattered RF energy as having the same signature or pattern in log-frequency vs. time. In exemplary embodiments a matched filter can be used for the detection step at 306. Such a matched filter can be utilized to detect partially obscured, weak, or temporary heterodyned tones.

It will be appreciated that these desired heterodyned-tones can lie outside the passband of the metasurface, e.g., above the upper limit (and/or below the lower limit) of frequency of that passband. This provides another advantage to detection: the gain of the radar antenna, for example, will be higher for the heterodyned-tones that are above the upper frequency limit of the metasurface passband(s), because their higher frequency has more received gain, since the antenna area will be larger in terms of (these shorter) wavelengths. Because metasurfaces may and can be designed to thwart detection over a wide passband, for example in cloaking, these heterodyned products above and below a metasurface's passband will be readily detectable by embodiments of the present disclosure, but may be present at relatively low power levels compared to the power of the transmitted tones, e.g., 202 in FIG. 2. Exemplary embodiments of the present disclosure, however, can be used to detect heterodyned tones at frequencies above such a passband so that these heterodyned frequencies will be detected with the higher gain (resulting from reception at the higher frequencies and the known inverse relationship between gain and the square of the frequency) of the antenna aperture, countering somewhat the low power of the heterodyned tone(s). For example, for a given receive antenna aperture, if these heterodyned products are, say, four times that passband cutoff frequency, the gain of the antenna will compensate with about 16 times the gain. Suitable low-pass, passband, and/or high-pass filters can be used in the receiver 108 and/or pattern detection system no to facilitate detection of heterodyned tones at desired frequency bands.

Key components of exemplary embodiments may include, but are not limited to, a transmission system for the generation and propagation, using an antenna, two electromagnetic wave tones, which may vary in frequency with time; impinging of these EM waves on a metasurface, which can be moving, with a Doppler velocity relative to the radar system; backscattered and or side scattered emission of heterodyned-tones; reception (via an antenna and receiving system) of these back to the radar system or a bistatic receiver point; algorithmic arithmetic or cross correlation in the log frequency-time display of these heterodyned-tones, constituting detection of the metasurface, via electronic and computational mechanisms, acting as a pattern detector.

Embodiments may be stationary and/or part of a moving unit (mobile), and may be used to detect and home in on devices using or having one or more metasurface(s).

It will be appreciated that this detection will provide information on the distance, velocity, acceleration, and path of the metasurface-having device or object as a function of time.

Devices or objects incorporating metasurfaces may include, but are not limited to: planes, fuselages, or plane wings and other flight control surfaces; ships and or vessels; rockets and or missiles; vehicles; people with partial metasurface coverings; helmets; projectiles; windows; metasurface-including camouflage; firearms; buildings; bunkers; shields; antennas; sensors; and so on.

As was noted above, a bistatic antenna configuration may be used in exemplary embodiments, and an array is preferably used for such a bistatic configuration. A larger receiver aperture afforded by an array can optimally pick up heterodyne combinations. Further, the use of the term "backscatter" as used herein can include reference to side-scattered energy.

While the transmitted waves (Tx) are shown as having a linear chirp, this is not required. Other waveforms and frequencies can be used in other embodiments and applications. For example, exponential chirps and/or frequency hopping may be used in some embodiments.

Unless otherwise indicated, pattern detection/detection system and filtering (including cross correlation or correlation) that have been discussed herein are or can be implemented with a specially-configured computer system specifically configured to perform the functions that have been described herein for the component/system/algorithm step (s). Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may be or include a desktop computer or a portable computer, such as a laptop computer, a notebook computer, a tablet computer, a PDA, a smartphone, or part of a larger system, such a vehicle, appliance, and/or telephone system. Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, or the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All patents and patent applications, including published patent applications that have been cited in this disclosure are incorporated herein by reference in their respective entireties.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A radar system for detecting one or more objects having a metasurface, the system comprising:
   a transmitter configured to generate an RF pulse having RF energy at two or of more tones, wherein the tones are swept in frequency over a time period;
   a transmitting antenna configured to transmit the RF pulse energy;
   a receiving antenna configured to receive two or more heterodyned tones that have been backscattered from an object in response to the RF pulse being incident on the object, wherein the object has a metasurface;
   a receiver operative to receive the backscattered two or more heterodyned tones; and
   a pattern detector, connected to the receiver and operative to detect the backscattered two or more heterodyned tones as swept over the time period to identify the presence of the metasurface.

2. The radar system of claim 1, wherein the metasurface is disposed on a satellite.

3. The radar system of claim 1, wherein the metasurface is disposed on a spacecraft.

4. The radar system of claim 1, wherein the metasurface is disposed on a missile.

5. The radar system of claim 1, wherein the metasurface is disposed on an aerospace vehicle.

6. The radar system of claim 1, wherein the metasurface is disposed on an airplane.

7. The radar system of claim 1, wherein the metasurface is disposed on an unmanned aerial vehicle.

8. The radar system of claim 1, wherein the metasurface is disposed on a vessel.

9. The radar system of claim 1, wherein the metasurface is disposed on a land-based vehicle.

* * * * *